United States Patent

Chen et al.

[11] Patent Number: 5,874,053
[45] Date of Patent: Feb. 23, 1999

[54] HORIZONTAL REGENERATIVE CATALYTIC OXIDIZER

[75] Inventors: James M. Chen, Edison; Richard A. Gay, Hasbrouck Heights, both of N.J.; Sean T. Gribbon, Farmington Hills, Mich.

[73] Assignee: Automotive Systems Laboratory, Inc., Farmington Hills, Mich.

[21] Appl. No.: 980,844

[22] Filed: Dec. 1, 1997

Related U.S. Application Data

[62] Division of Ser. No. 742,807, Nov. 1, 1996.

[51] Int. Cl.⁶ .......................... B01D 53/00; F27D 17/00; F23B 5/00
[52] U.S. Cl. .......................... 422/171; 422/168; 422/169; 422/170; 422/175; 422/181; 422/182; 422/173; 422/177; 432/179; 432/180; 431/5
[58] Field of Search .................................... 422/168, 169, 422/170, 171, 175, 177, 178, 182, 173; 432/179, 180, 181, 182; 431/5

[56] References Cited

U.S. PATENT DOCUMENTS

| | | | |
|---|---|---|---|
| 2,121,733 | 6/1938 | Cottrell | 133/8 |
| 3,870,474 | 3/1975 | Houston | 422/171 |
| 4,470,806 | 9/1984 | Greco | 432/182 |
| 4,474,118 | 10/1984 | Benedick | 110/211 |
| 4,478,808 | 10/1984 | Matros et al. | 423/522 |
| 4,646,712 | 3/1987 | Ferguson et al. | 126/79 |
| 4,650,414 | 3/1987 | Grenfell | 431/5 |
| 5,000,422 | 3/1991 | Houston | 251/306 |
| 5,024,817 | 6/1991 | Mattison | 422/111 |
| 5,026,277 | 6/1991 | York | 432/181 |
| 5,101,741 | 4/1992 | Gross et al. | 110/233 |
| 5,129,332 | 7/1992 | Greco | 110/233 |
| 5,163,829 | 11/1992 | Wildenberg | 431/5 |
| 5,221,522 | 6/1993 | Cash | 422/171 |
| 5,262,131 | 11/1993 | Bayer et al. | 422/175 |
| 5,352,115 | 10/1994 | Klobucar | 432/181 |
| 5,364,259 | 11/1994 | Matros et al. | 431/5 |
| 5,366,708 | 11/1994 | Matros et al. | 423/210 |
| 5,417,927 | 5/1995 | Houston | 422/110 |
| 5,531,593 | 7/1996 | Klobucar | 432/181 |
| 5,578,276 | 11/1996 | Klobucar | 422/173 |
| 5,589,142 | 12/1996 | Gribbon | 422/171 |

FOREIGN PATENT DOCUMENTS

| | | |
|---|---|---|
| 0 587 064 | 3/1994 | European Pat. Off. . |
| 0 232 731 | 8/1987 | Germany . |
| 0 337 143 | 10/1989 | Germany . |
| WO 90/14560 | 11/1990 | Germany . |
| 0 629 432 A1 | 9/1994 | Hague Agreement ......... B01D 53/36 |
| 0472605 | 1/1994 | United Kingdom . |
| WO 96/25224 | 8/1996 | WIPO . |

*Primary Examiner*—Gary P. Straub
*Assistant Examiner*—Milan M. Vinnola
*Attorney, Agent, or Firm*—Lyon, P.C.

[57] ABSTRACT

A system for the abatement of industrial process emissions comprises a horizontal regenerative catalytic oxidizer (RCO). The system utilizes at least two regenerative chambers and at least two catalytic chambers in a controlled abatement process. Pollutants injected into the RCO from the process emissions are catalytically oxidized. The horizontal configuration of the RCO reduces the size of the RCO per cubic foot of emissions treated, and also simplifies maintenance requirements in removing and replacing, or regenerating, the catalyst. Chutes and valves situated above and below the catalyst provide maintenance means without the associated contamination concerns typically caused by catalytic migration throughout vertically configured RCOs.

3 Claims, 1 Drawing Sheet

HORIZONTAL REGENERATIVE CATALYTIC OXIDIZER

CROSS-REFERENCE TO RELATED APPLICATIONS

The present application is a divisional of copending U.S. patent application Ser. No. 08/742,807 file on Nov. 1, 1996.

BACKGROUND OF THE INVENTION

The present invention relates generally to the abatement of contaminant laden industrial process emissions and more particularly, to a system which utilizes a regenerative catalytic oxidizer (RCO) to perform the abatement process.

Regenerative catalytic oxidizers recover and transfer heat remaining in the cleansed exhaust gas to emissions entering the oxidizer thereby minimizing the amount of supplemental energy required to raise the emission to its ignition temperature. Characteristically, flow control valves are used to direct the emissions to one or more regenerators for preheating prior to thermal or catalytic oxidation.

Industrial process emissions typically contain particulates and major gaseous air pollutants such as volatile organic compounds (VOCs), nitrogen oxides ($NO_x$) and carbon monoxide (CO), all of which contaminate the environment when vented to the atmosphere. Regenerative catalytic oxidizers (RCO) utilize a catalytic material to effect oxidation of the VoCs and CO at lower peak temperatures than, for example, treatment by thermal oxidation. The catalytic material is located in the higher temperature zones of the RCO, adjacent to a combustion chamber wherein a burner or supplementary heat source is used to heat the catalyst. An RCO also utilizes heat storage media, usually located in the lower temperature zones at the gas entrance and exit ports, thereby facilitating fluid heat transfer as the heated gas is passed through.

The system typically consists of multiple beds of heat storage and catalyst materials. These beds are connected to a common chamber where a heater, such as a burner, is utilized to heat the gas to the desired operating temperature, normally in the range of 600° F. ($\approx 315°$ C.) to 1000° F. ($\approx 540°$ C.), thereby effecting catalytic conversion of the VOCs, and CO, and producing water and $CO_2$.

As the catalyst becomes aged due to repeated reaction of gases, the exhausted catalyst must either be regenerated or be replaced. Shape is critical when considered in a maintenance context. If regenerative cleaning is a design consideration, random catalysts such as spherical or saddle shaped catalytic particles are preferred. The commonly designed honeycomb configuration is not readily regenerated by water or other cleaning agents given the entrainment of these fluids due to blockages within the catalytic bed.

RCOs generally utilize a vertical orientation of components resulting in vertical flow in and out of the reactor. Such vertical orientation is less than desirable for several reasons. Due to channeling and inefficient utility related to a vertical emission flow regime, a vertically orientated RCO must be significantly sized per cubic foot of process emissions treated. In addition, because the catalyst is generally disposed immediately above the heat media, percolation of the catalytic material through the heat media can cause blockages and inefficient heat exchange within the heat exchange bed. Furthermore, again due to possible heat media contamination, the vertical design makes catalyst regeneration, or removal and replacement, difficult.

SUMMARY OF THE INVENTION

The aforesaid problems are solved, in accordance with a preferred constructed embodiment of the present invention, by an abatement system for industrial process emissions comprising a horizontal regenerative catalytic oxidizer. The present invention provides for simplified removal and replacement, or regeneration of catalytic material thereby reducing maintenance and operational expenses.

The present invention operates in abatement cycles and comprises a plurality of regenerative beds and a corresponding number of catalytic beds that when positioned together form a single horizontal orientated system. The emissions flow from a contaminated feed duct through a selectively opened valve and inlet duct to a regenerative chamber for preheating. The emissions then flow through a catalytic oxidizer, which oxidizes VOCs and CO present in the emissions. After reaction, emissions then flow into a combustion chamber and are held for a predetermined period of time, after which the purified emissions flow through a second set of components comprising a catalyst and a regenerative bed, and thence through an open outlet valve for venting to atmosphere or other use.

The regenerative bed comprises a honeycombed heat media, and the catalytic bed comprises a plurality of particles, generally spherical in shape and uniform in size. However, depending on design considerations, the catalytic bed may also contain catalytic saddles or honeycombed structured catalysts. A grate or honeycombed structure is disposed between the catalyst and the combustion chamber, with passages small enough in both the regenerative bed and in the grate to inhibit lateral flow of catalyst out of the catalyst chamber.

DETAILED DESCRIPTION OF THE PREFERRED EMBODIMENT(S)

Figure 1:
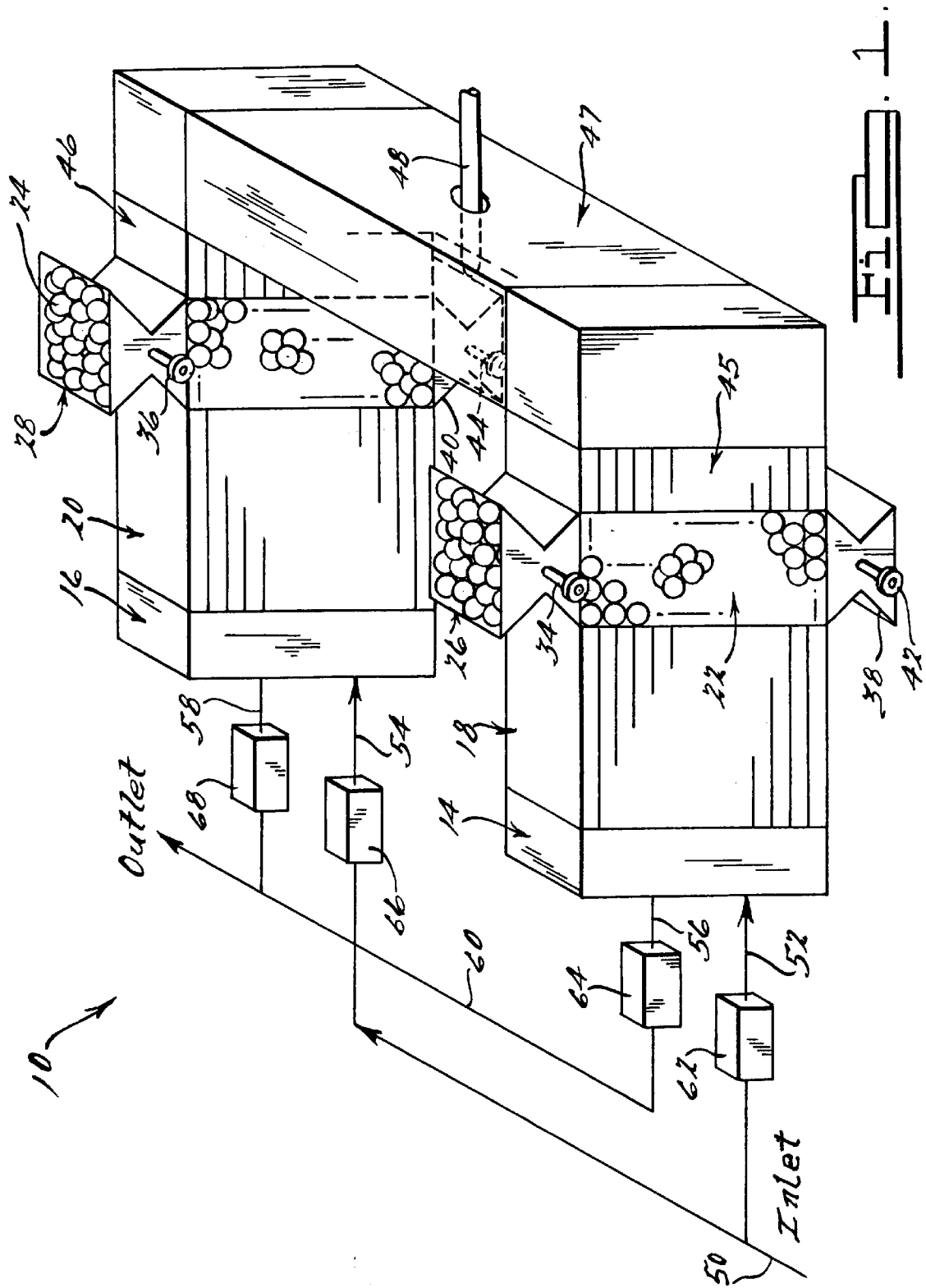
FIG. 1 is a diagrammatic representation of a horizontal regenerative catalytic oxidizer unit, in accordance with the present invention.

In accordance with the present invention, a first embodiment for a horizontal regenerative catalytic oxidizer (hereinafter "RC0") 10, is shown in FIG. 1 comprising two distribution/collection plenums, 14 and 16, and two conventional regenerator chambers 18 and 20. Heat regenerative chambers 18 and 20 are provided with a conventional honeycombed heat exchange media preferably having a specific heat of 0.21 BTU/lb/°F., a density of at least 40 $lb/ft^3$, and a geometric area of 200 $ft^2/ft^3$, to provide maximum thermal efficiency.

The RCO 10 further comprises catalytic chambers 22 and 24 preferably spherical in shape and 0.25 to 1 inch in diameter, and having a crush strength of greater than 40 psi. The catalytic chambers may also comprise saddles or other random particles if cleaning or regeneration is a design criterion. If cleaning is not critical, then honeycombed catalysts may be used.

The catalytic chambers 22 and 24 have upper access chutes 26 and 28, controlled by valves 34 and 36, and lower discharge chutes 38 and 40 controlled by valves 42 and 44, respectively. The chutes 26, 28, 38, and 40 provide for replacement and removal of catalyst as well as for regeneration thereof by rinsing the top of the chamber down and then draining from the bottom chute.

Suitable grates or honeycomb structures 45 and 46, having passageways two thirds, or less the size of the diameter of the average catalytic particle, and immediately following and communicating with catalytic chambers 22 and 24, respectively, are used to inhibit migration of the catalyst out of the catalytic chambers. Catalytic particles are therefore trapped within the catalytic chambers 22 and 24 formed between the honeycombed heat exchange media 18 and 20, and the grates 45 and 46, respectively.

A common combustion chamber 47 communicates with each catalytic bed 22 and 24. Fuel, for example natural gas, is supplied to the combustion chamber 47 from a fuel controller and burner 48 or other heat source. Contaminated emission feed duct 50 admits process emissions into the RCO 10 through a pair of inlet ducts 52 and 54. Cleansed air is conducted away from the RCO 10 by a pair of outlet ducts 56 and 58, which feed a cleansed exhaust duct 60, and is vented to atmosphere. The RCO 10 utilizes a plurality of valves 62, 64, 66, and 68 to control the cyclic flow of contaminated emissions and cleansed air to and from the RCO.

The flow control valves 62, 64, 66, and 68 are preferably power actuated electronically controlled valves of the type disclosed in U.S. Pat. No. 5,000,422, or copending U.S. application Ser. No. 08/087,658, filed Jul., 6, 1993, entitled, "Air Seal Valve" now U.S. Pat. No. 5,327,928. Power actuation of the valves 62, 64, 66, and 68 under the control of a computer offers precise timing and positive actuation.

In a first operational cycle, inlet valve 62 is open, while inlet valve 66 is closed, thereby establishing chamber 18 as a feed bed and chamber 20 as an exhaust bed. Contaminated emissions, i.e. industrial process exhaust, flow through feed duct 50, inlet valve 62, inlet duct 52 and distribution/ collection plenum 14, to regenerative chamber 18 wherein the emissions are preheated. The emissions then flow through catalyst 22, where heat produced by burner 48 causes the catalyst to catalytically effect oxidation of a substantial concentration of VOCs and CO at temperatures typically below 800° F. ($\approx$466° C.). The catalyst 22 may directly communicate with bed 18 (as shown), or alternatively, may be physically separated while in the same housing.

In accordance with the present invention, the oxidized emissions then flow through common combustion chamber 47. The emissions are elevated to the temperature of chamber 47 for a retention time of, for example, about 0.5 seconds. The combustion chamber 47 enhances efficiency of the RCO by insuring VOC and Co destruction.

The cleansed exhaust then flows out of the combustion chamber 47 into catalyst 24, through regenerative chamber 20, distribution/collection plenum 16, outlet duct 58, and open outlet valve 68 to the cleansed exhaust duct 60 for discharge to the atmosphere or other use. Efficiency of the RCO 10 is further enhanced because any residual amounts of VOCs and CO which escape combustion are oxidized by the catalyst 24. Since regenerative chamber 20 is operating as the exhaust bed, a heat exchange between the hot exhaust and the bed media preheats the bed, thereby establishing the desired regenerative effect as outlet flow continues through open outlet valve 58 from bed 20.

Computer automated control is used to facilitate a change in cycles. Outlet valve 68 begins to close while outlet valve 64 begins to open. Simultaneously, inlet valve 66 begins to open as inlet valve 62 begins to close. Ultimately, the second abatement cycle begins with inlet valve 66 open, outlet valve 64 open, inlet valve 62 closed, and outlet valve 68 closed.

In operation, the second leg of the abatement cycle flows in reverse order with respect to the first cycle but with similar features. Thus, contaminated emissions flow from feed duct 50. through open inlet valve 66, inlet duct 54, and distribution/collection plenum 16 to regenerative chamber 20, now operating as the feed bed. The catalyst 24 oxidizes VOCs and CO in the emissions. The emissions then flow through common combustion chamber 47, thence outwardly through catalyst 22, regenerator 18, distribution/collection plenum 14, outlet duct 56, valve 64, and exhaust duct 60. The cycles switch again, as described hereinabove, thereby facilitating alternate flow of the process gases.

The horizontal configuration allows for easy access and simplified maintenance when removing and replacing the catalyst, or when cleaning or regenerating the catalyst by introducing water or cleaning solvents, for example, through the upper chute. Unlike the vertical configuration, any solids that are rinsed from the catalyst will settle or drain to the lower chute, as opposed to the heat media bed, and can be emptied there along with the contaminated fluid.

Finally, the horizontal configuration provides for a reduced volume or size of the RCO per cubic foot of process emissions processed, and therefore a reduction in raw materials required when manufacturing the RCO. The smaller footprint provides greater efficiency per cubic foot of the RCO, as compared to the vertical configuration.

While FIG. 1 illustrates the present invention as applied to two regenerative bed systems, one of ordinary skill in the art will readily appreciate that the features and advantages of the present invention are equally applicable to other numbers of regenerative beds, for example a three or a four bed RCO. A purge cycle, for example, as taught in U.S. Pat. No. 5,163,829 to Wildenberg, the discussion of which is hereby incorporated by reference, may also be incorporated. Furthermore, this invention may also accommodate other purification means such as a selective catalytic reduction bed disclosed in coowned and copending application Ser. No. 08/280,944, filed Jul. 27, 1994, and entitled, "Integrated Regenerative Catalytic Oxidation/Selective Catalytic Reduction Abatement System"now U.S. Pat No. 5,589,142, designed to reduce NOX emissions to $N_2$.

While the preferred embodiment of the invention has been disclosed, it should be appreciated that the invention is susceptible of modification without departing from the scope of the following claims.

We claim:

1. A regenerative catalytic oxidizer for removal of contaminants from process emissions comprising:

an input regenerative unit having means on one side thereof for receiving a horizontal flow of contaminated process emissions;

an exhaust regenerative unit having means on one side thereof for receiving a horizontal flow of hot cleansed exhaust;

a combustion chamber connected between and horizontally configured with said input regenerative unit and said exhaust regenerative unit for heating said process emissions to an abatement temperature sufficient to destroy said contaminants;

a first catalytic oxidizer connected between and horizontally configured with said input regenerative unit and said combustion chamber, said first catalytic oxidizer comprising an upper and lower access chute, said upper access chute having a first valve and said lower access chute having a second valve;

a first catalyst containment structure connected between and horizontally configured with said first catalytic oxidizer and said combustion chamber;

a second catalytic oxidizer connected between and horizontally configured with said exhaust regenerative unit and said combustion chamber, said second catalytic oxidizer comprising an upper and lower access chute, said upper access chute having a first valve and said lower access chute having a second valve;

a second catalyst containment structure connected between and horizontally configured with said second catalytic oxidizer and said combustion chamber;

wherein said catalytic oxidizers comprise catalytic media, and said catalyst containment structures comprise emission passages of a size small enough to inhibit lateral flow of said catalytic media, and means for controlling the input of said process emissions and the removal of said cleansed exhaust thereby controlling the heat exchange in said regenerative units;

wherein said means periodically reverse the direction of flow of said process emissions such that said input regenerative unit and said exhaust regenerative unit are alternated so that said exhaust regenerative unit operates as the input regenerative unit and said input regenerative unit operates as the exhaust regenerative unit.

2. A regenerative catalytic oxidizer of claim 1 wherein said input regenerative unit and said exhaust regenerative unit each comprise honeycombed heat exchange media.

3. A regenerative catalytic oxidizer of claim 1 wherein said catalytic media comprises a plurality of catalyst particles.

* * * * *

UNITED STATES PATENT AND TRADEMARK OFFICE
CERTIFICATE OF CORRECTION

PATENT NO. : 5,874,053
DATED : Feb. 23, 1999
INVENTOR(S) : James M. Chen, et al

It is certified that error appears in the above-indentified patent and that said Letters Patent is hereby corrected as shown below:

On title page, item

[73] Assignee: Should read
--Engelhard Corporation, Iselin, NJ--

Signed and Sealed this

Fifth Day of October, 1999

Attest:

Attesting Officer

Q. TODD DICKINSON

Acting Commissioner of Patents and Trademarks